Nov. 14, 1933.  F. WALLACE  1,935,530

DRAINAGE TRAP

Filed May 9, 1932

Frank Wallace,
INVENTOR

BY Victor J. Evans & Co.
ATTORNEY

WITNESS

Patented Nov. 14, 1933

1,935,530

UNITED STATES PATENT OFFICE 1,935,530

DRAINAGE TRAP

Frank Wallace, Willard, Ohio

Application May 9, 1932. Serial No. 610,223

1 Claim. (Cl. 182—25)

The invention relates to a drainage trap and more especially to a back water trap for sewerage systems.

The primary object of the invention is the provision of a trap of this character designed especially for use in the drainage of cellars and adapted for the prevention of the flow of back or flood water from the sewer or from other pipe lines with less than twenty pounds pressure, the trap being also usable to keep sewerage gases from escaping into an inclosure such as a cellar or the like.

Another object of the invention is the provision of a trap of this character, wherein a ball float, preferably soft rubber, will be operated upon by the water in a large chamber in the trap, so that when back water commences to flow the float rises and becomes seated at the mouth of the trap, thereby preventing the escape of back water or gases present in the drainage system.

A further object of the invention is the provision of a trap of this character, wherein the construction thereof is novel in form so that access may be had to the interior thereof in event of damage thereto or if the trap fails to properly function, the trap being readily accessible for cleaning purposes to relieve obstructions and the same functions automatically so as to check back water flow in a drainage system.

A still further object of the invention is the provision of a trap of this character which is extremely simple in construction, thoroughly reliable and efficient in its purpose, strong, durable, readily accessible, possessing but few parts, and inexpensive to manufacture and install.

With these and other objects in view, the invention further consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:—

Figure 2 is a vertical longitudinal sectional view showing the trap placed within the foundation or floor of a cellar or the like.

Similar reference characters indicate corresponding parts throughout the several views in the drawing.

Figure 1:
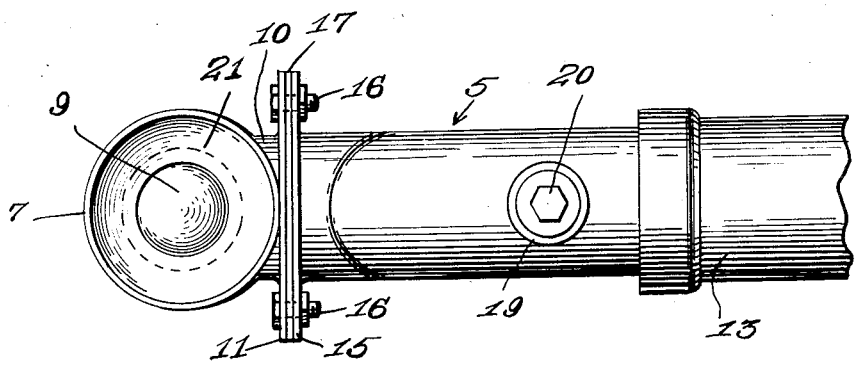
Figure 1 is a top plan view of a trap constructed in accordance with the invention.

Referring to the drawing in detail, the trap comprises a body 5 forming a chamber 6 and this body is provided with a mouth 7 which opens upwardly, the mouth interiorly thereof being upwardly tapered to provide a valve seat 8 for a ball float or valve 9, the latter being preferably made from soft rubber and when lifted by water within the chamber 6 will become seated in the seat 8 to close the mouth 7 as will be obvious.

The body 5 is provided with a lower nipple 10 having a flange 11 for the connection therewith of a coupling neck 12 which is joined with a lead 13 of a drainage pipe system, the neck 12 being formed with a downwardly directed bend or bight 14 and this portion has a flange 15 to register with the flange 11 of the body 5 for the joining thereof through the medium of removable nut carrying bolts or other like fasteners 16.

Arranged between the body 5 and the neck 12 intermediate of the flanges 11 and 15 is a sieve plate 17 preferably made from sheet copper having the perforations 18 grouped therein, the plate 17 functioning to prevent the float or valve 9 when becoming lowered entering the neck 12 and thus finding its way into the sewer. Furthermore, this plate 17 acts as a check for screening fine matter to prevent the same from entering the chamber 6 in the body 5 and thus interfering with the free functioning of the float or valve 9 in the use of the trap.

The neck 12 at its upper side is formed with an internally threaded nipple 19 having fitted therein a removable plug 20 so that access may be had through this nipple 19 to the neck 12 for cleaning purposes.

The trap, in the use thereof, will check back water from the sewer system and also will obviate the escape of gases as may be present in such sewer or drainage system. The float or valve 9 is automatically operable by the water within the trap and functions when the pressure of such water is not greater than twenty pounds.

The trap in its construction is designed to be used on water lines entering large water tanks to automatically shut off power plants, especially if the latter is equipped with an automatic mechanism and the pressure is not greater than twenty pounds.

Figure 2:
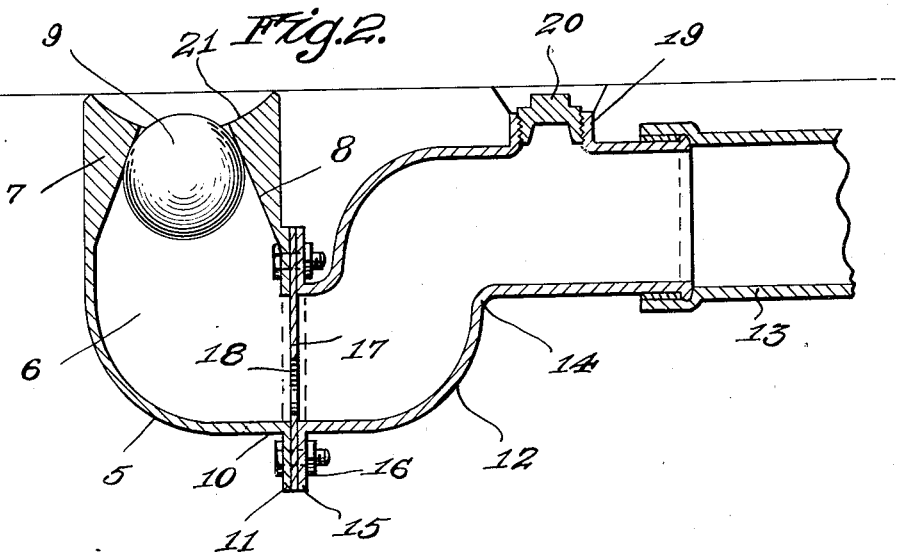
Figure 3:
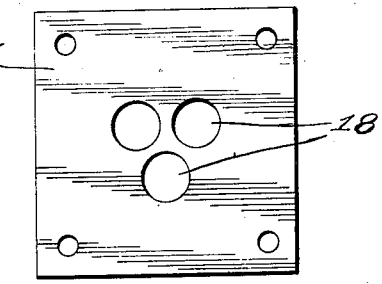
Figure 3 is a plan view of the sieve removed from the trap.

The trap in the installation is sunk within a foundation or floor of an inclosure such as a cellar or the like so that the mouth 7 will open through the top surface of such foundation or floor and likewise the plug 20 detachably engaged in the nipple 19 is accessible as is clearly shown in Figure 2 of the drawing.

The mouth 7 is provided with a concaved recess or outer end 21 so that water upon the top surface of the foundation or floor can flow thereinto.

From the foregoing it is thought that the construction and manner of use of the trap will be clearly understood and therefore a more extended explanation has been omitted.

What is claimed is:—

A drainage trap comprising an elbow-shaped body having a substantially conical-shaped internal contraction at one end, said contraction being formed with a concaved bowl opening outwardly, a perforated plate covering the other end of said body, and a resilient ball-shaped float within said body and adapted for seating in the contraction.

FRANK WALLACE.